(12) United States Patent
Moore et al.

(10) Patent No.: US 6,991,576 B2
(45) Date of Patent: *Jan. 31, 2006

(54) MAGNETICALLY RESPONSIVE LIMITED SLIP DIFFERENTIAL

(75) Inventors: Jason E. Moore, Clarkston, MI (US); Frederick E. Zink, Capac, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,943

(22) Filed: Nov. 16, 2004

(65) Prior Publication Data

US 2005/0064978 A1   Mar. 24, 2005

Related U.S. Application Data

(63) Continuation of application No. 10/358,704, filed on Feb. 5, 2003, now Pat. No. 6,817,961.

(51) Int. Cl.
*F16H 48/06* (2006.01)
*F16D 27/00* (2006.01)

(52) U.S. Cl. ............................ 475/231; 192/21.5
(58) Field of Classification Search ............... 475/85, 475/150, 231; 182/21.5
See application file for complete search history.

(56) References Cited

U.S. PATENT DOCUMENTS

| | | |
|---|---|---|
| 4,444,298 A | 4/1984 | Stangroom |
| 4,896,754 A | 1/1990 | Carlson et al. |
| 5,007,513 A | 4/1991 | Carlson |
| 5,147,252 A | 9/1992 | Mace et al. |
| 5,322,484 A | 6/1994 | Reuter |
| 5,358,084 A | 10/1994 | Schramm |
| 5,730,531 A | 3/1998 | Pinkos et al. |
| 5,779,013 A | 7/1998 | Bansbach |
| 5,845,753 A | 12/1998 | Bansbach |
| 5,915,513 A | 6/1999 | Isley, Jr. et al. |
| 6,183,386 B1 | 2/2001 | Duggan |
| 6,334,832 B1 | 1/2002 | Heravi et al. |
| 6,428,441 B1 * | 8/2002 | Hunt .................... 475/231 |
| 6,454,674 B1 * | 9/2002 | Krzesicki et al. ......... 475/85 |
| 6,527,661 B2 * | 3/2003 | Leeper ................. 475/150 |
| 6,585,616 B1 * | 7/2003 | Robinson ............... 475/85 |
| 6,817,961 B2 * | 11/2004 | Moore et al. ............. 475/85 |

FOREIGN PATENT DOCUMENTS

GB    2385100 A   *  8/2003

* cited by examiner

*Primary Examiner*—Roger Pang
(74) *Attorney, Agent, or Firm*—Harness, Dickey & Pierce P.L.C.

(57) ABSTRACT

A differential assembly includes a case, a gearset having a pair of pinion gears and a pair of side gears, and an electrically operable coupling including a magnetically responsive fluid. The coupling is operable to selectively interconnect one of the side gears to the case. In one instance, the present invention includes a rotor having a plurality of outwardly extending blades positioned in communication with a magneto-rheological fluid. An electromagnet is selectively actuated to change the viscosity of the magneto-rheological fluid. In this manner, the differential may function as an "open" differential, a "locked" differential or a differential accommodating a limited-slip condition.

25 Claims, 6 Drawing Sheets

MAGNETICALLY RESPONSIVE LIMITED SLIP DIFFERENTIAL

CROSS-REFERENCE TO RELATED APPLICATIONS

This application is a continuation of U.S. patent application Ser. No. 10/358,704 filed Feb. 5, 2003, U.S. Pat. No. 6,817,961.

BACKGROUND OF THE INVENTION

The present invention generally relates to differentials for motor vehicles and, more particularly, to a limited slip differential employing a magneto-rheological fluid to control operation of the differential.

As is known, many motor vehicles are equipped with driveline systems including differentials which function to drivingly interconnect an input shaft and a pair of output shafts. The differential functions to transmit drive torque to the output shafts while permitting speed differentiation between the output shafts.

Conventional differentials typically include a pair of side gears fixed for rotation with the output shafts and two or more sets of meshed pinion gears mounted within a differential case. However, such conventional differentials have a deficiency when a vehicle is operated on a slippery surface. In particular, when one wheel of the vehicle is on a surface having a low coefficient of friction, most or all of the drive torque will be delivered to the slipping wheel. As a result, the vehicle often becomes immobilized. To overcome this problem, it is known to provide the differential with an additional mechanism that functions to limit or selectively prevent speed differentiation of between the output shafts.

Typically, a friction clutch is incorporated into the differential to provide the limited-slip or non-slip function. In many instances, the friction clutch is a passively-actuated device which limits the differential speed between the output shafts only after a certain differential speed has been met. Additionally, such mechanical devices may not be selectively disengaged during operation of anti-lock braking systems or vehicle traction control systems. For example, four wheel anti-lock braking systems attempt to measure and control the rotational speed of each wheel independently. If a mechanical type limited slip differential is present, independent control of the speed of each wheel coupled to a differential is no longer possible. Accordingly, it would be desirable to provide an improved differential which may be actively controlled in conjunction with other control systems present on the vehicle.

SUMMARY OF THE INVENTION

The present invention relates to a differential assembly including a case, a gearset having a pair of pinion gears meshed with a pair of side gears, and an electrically operable coupling including a magnetically responsive fluid. The coupling selectively drivingly interconnects one of the side gears and the case. In one instance, the present invention includes a rotor having a plurality of outwardly extending blades positioned in communication with a magneto-rheological fluid. An electromagnet is selectively actuated to change the viscosity of the magneto-rheological fluid. In this manner, the differential may function as an "open" differential, a "locked" differential or an "active" differential accommodating a limited slip condition.

Another aspect of the present invention includes a differential assembly having an electronic controller wired in communication with the magneto-rheological coupling. The electronic controller is supplied with data from many vehicle sensors and systems such as an anti-lock braking system, a vehicle traction control system, or a cruise control system. The electronic controller may be programmed to actuate the magneto-rheological coupling based on calculations performed by the electronic controller or any number of inputs such as, for example, those received from vehicle sensors such as those detecting wheel speed, gear position, vehicle speed, transfer case range position, application of one or more brakes, among others.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is directed to an improved differential for a drivetrain of a motor vehicle. The differential of the present invention includes a rotor in communication with a magneto-rheological fluid to selectively limit the speed differentiation between two output shafts of a drive axle. It should be appreciated that the differential of the present invention may be utilized with a wide variety of driveline components and is not intended to be specifically limited to the particular application described herein.

Figure 1:
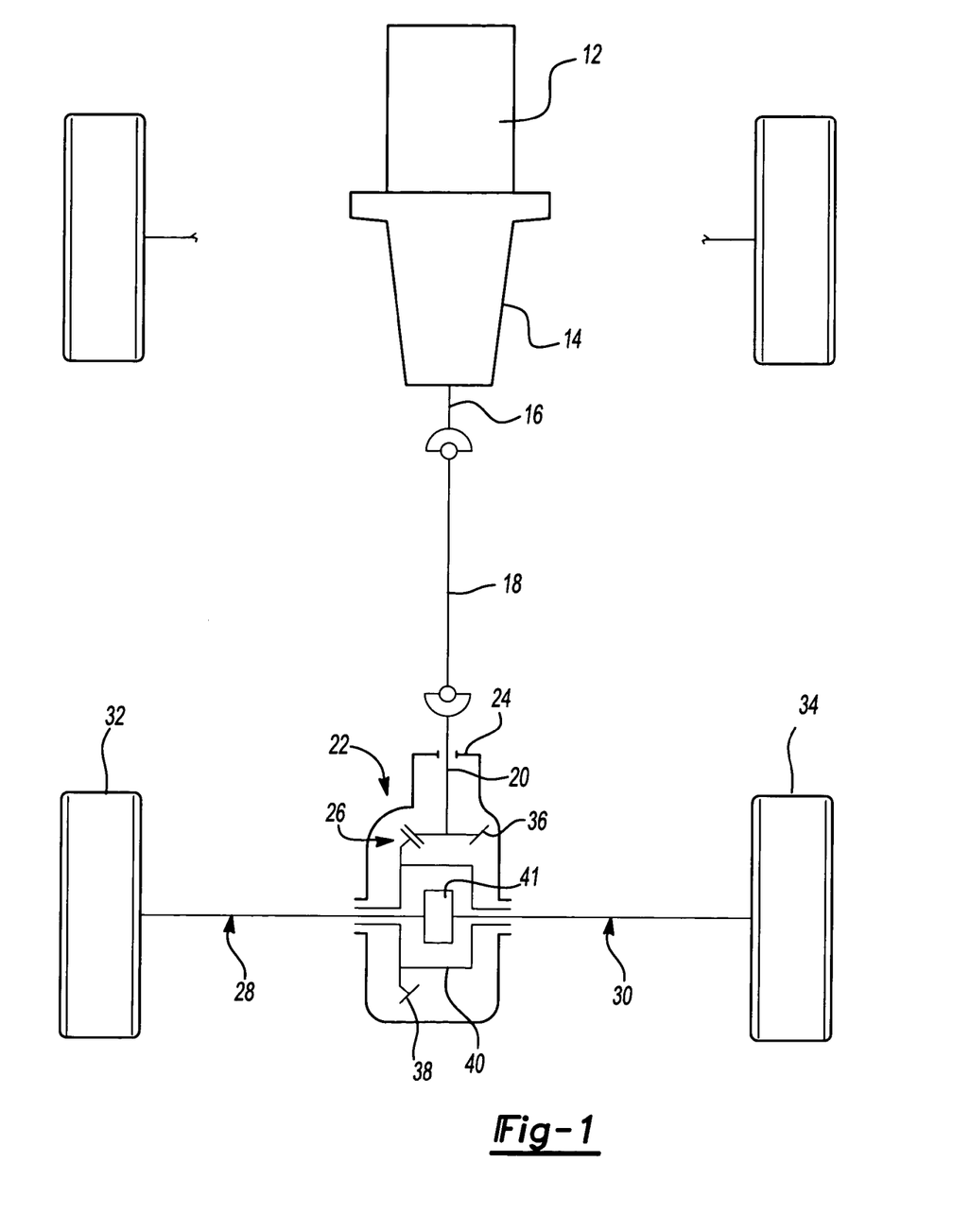
FIG. 1 is a schematic view of an exemplary motor vehicle drivetrain including a differential assembly of the present invention.

With reference to FIG. 1, a drivetrain 10 for an exemplary motor vehicle is shown to include an engine 12, a transmission 14 having an output shaft 16, and a propeller shaft 18 connecting output shaft 16 to a pinion shaft 20 of a rear axle assembly 22. Rear axle assembly 22 includes an axle housing 24, a differential assembly 26 supported in axle housing 24, and a pair of axleshafts 28 and 30 respectively interconnected to left and right and rear wheels 32 and 34. Pinion shaft 20 has a pinion gear 36 fixed thereto which drives a ring gear 38 that is fixed to a differential case 40 of differential assembly 26. A gearset 41 supported within differential case 40 transfers rotary power from differential case 40 to axleshafts 28 and 30, and facilitates relative rotation (i.e., differentiation) therebetween. Thus, rotary power from engine 12 is transmitted to axleshafts 28 and 30 for driving rear wheels 32 and 34 via transmission 14, propeller shaft 18, pinion shaft 20, differential case 40 and gearset 41. While differential assembly 26 is depicted in a rear-wheel drive application, the present invention is contemplated for use in differential assemblies installed in trailing axles, transaxles for use in front-wheel drive vehicles, transfer cases for use in four-wheel drive vehicles and/or any other known vehicular driveline application.

Figure 2:
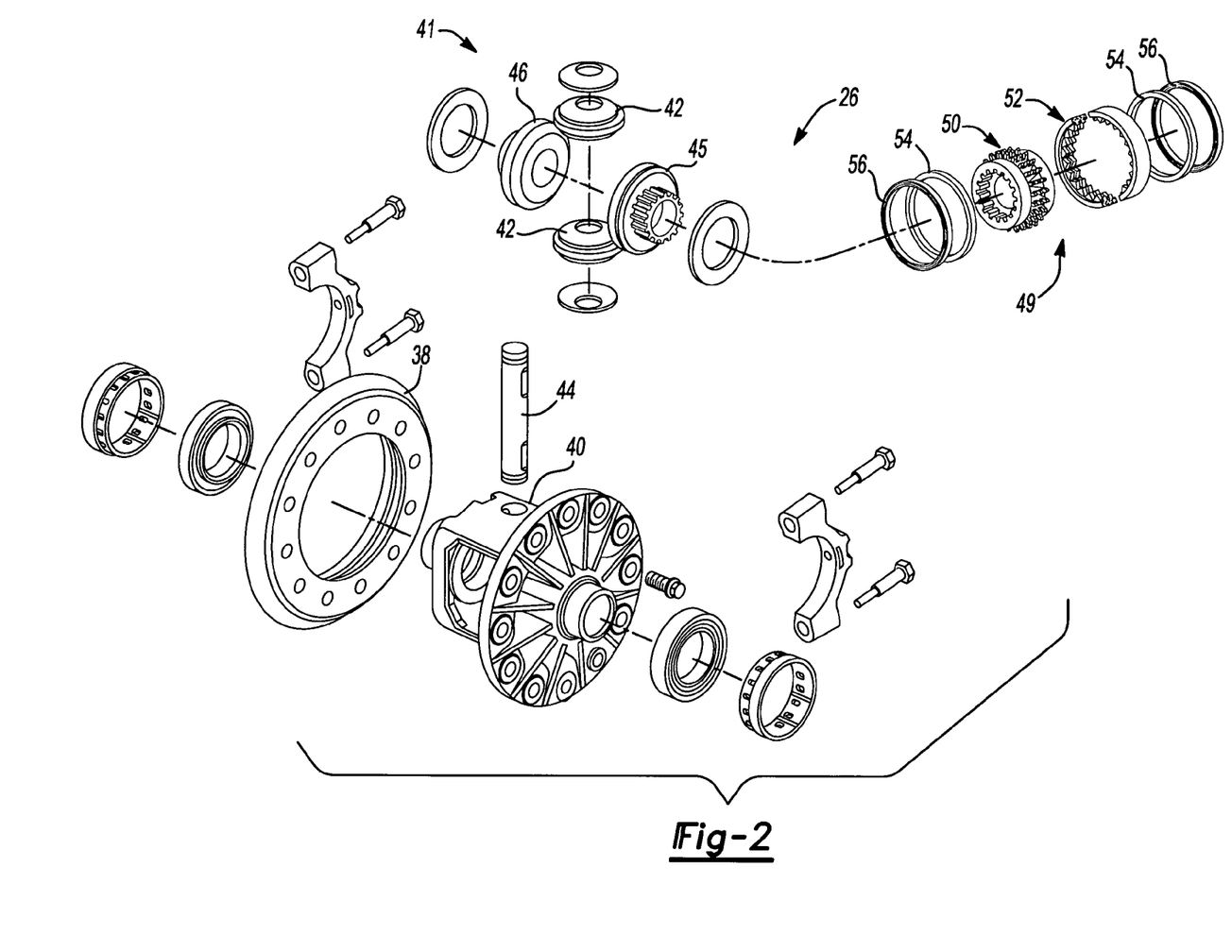
FIG. 2 is an exploded perspective view of the differential assembly of the present invention.

FIG. 2 depicts differential assembly 26 including differential case 40 and gearset 41. Gearset 41 includes a pair of pinion gears 42 rotatably supported on a cross shaft 44. First and second side gears 45 and 46 are meshed with pinion gears 42 and drivingly interconnected to axleshafts 28 and 30. Differential assembly 26 also includes a magneto-rheological coupling 49 having a rotor 50, an electromagnet 52, seals 54 and bearings 56. A magneto-rheological fluid 57 (FIG. 7) is captured between seals 54 and is in contact with rotor 50.

Figure 3:
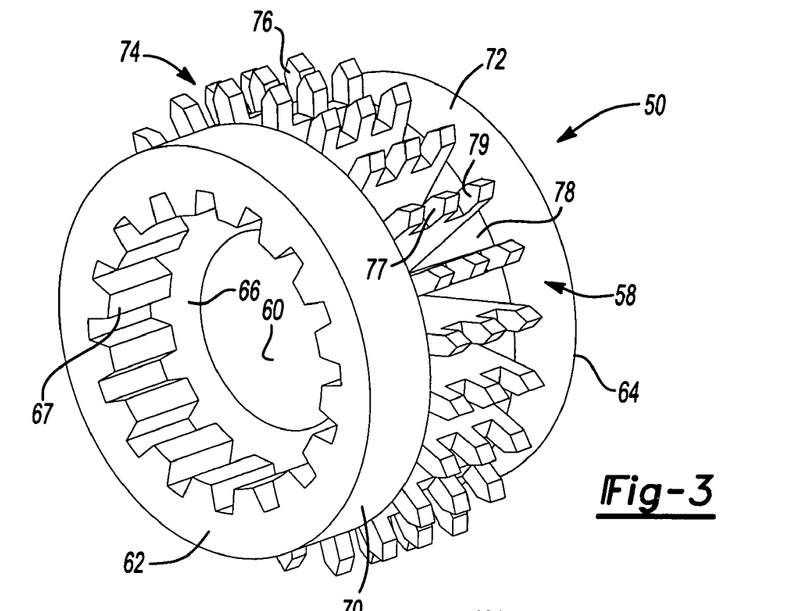
FIG. 3 is a perspective view of a rotor of the differential of the present invention.

With reference to FIG. 3, rotor 50 is shown to include a generally cylindrically shaped body 58 having a bore 60 extending from a first end face 62 to a second end face 64. A counterbore 66 extends inwardly from first end face 62. Counterbore 66 includes internal splines 67 that are sized for receipt on a splined trunnion portion 68 of first side gear 45. Rotor 50 may be coupled to first side gear 45 via one of any number of interconnection methods such as a straight spline, a press fit, a taper lock fit or any other suitable method for interconnecting torsion members. Rotor 50 also includes a first outer cylindrical surface 70 and a second outer cylindrical surface 72 that are positioned on opposite sides of a turbine section 74. Turbine section 74 includes a plurality of blades 76 which extends radially outwardly from body 58. A portion of each blade 76 extends beyond first and second outer cylindrical surfaces 70 and 72. In addition, each blade 76 has a pair of cut-out segments that define a pair of annular grooves 77 and 79 within turbine sections 74. Pockets 78 are also defined between each blade 76. As will be described in greater detail hereinafter, pockets 78 are useful for storing magneto-rheological fluid 57.

Figure 4:
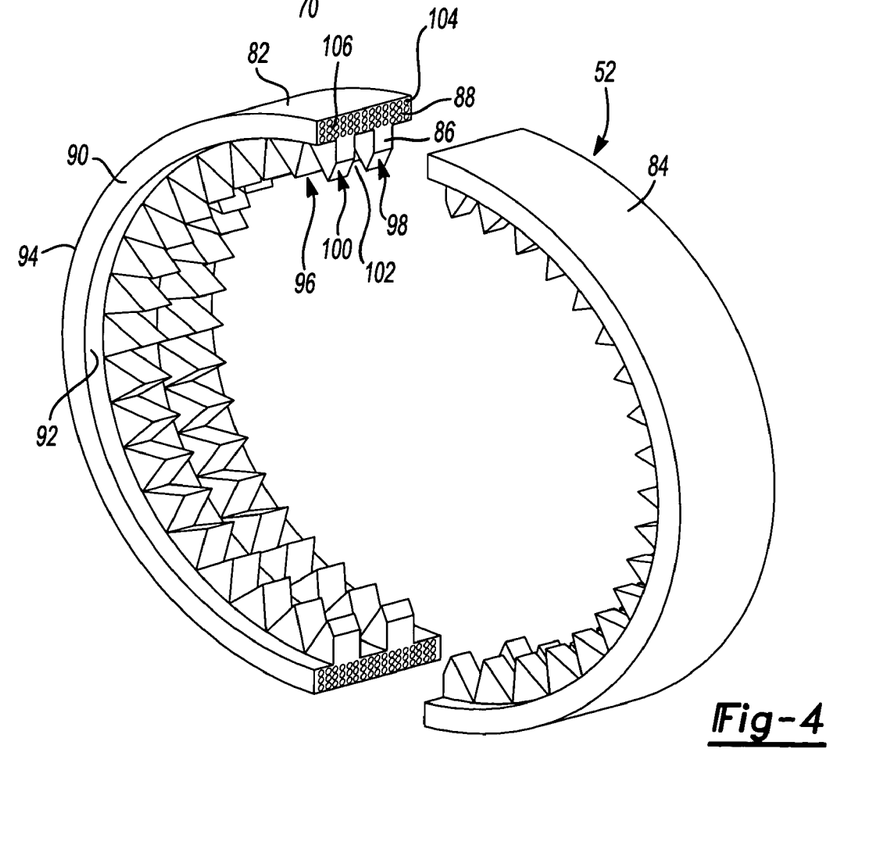
FIG. 4 is a perspective view of a first embodiment electromagnet for use in the differential of the present invention.

With reference to FIG. 4, a first embodiment electromagnet 52 includes a first half 82 and a second half 84. First half 82 includes a core 86 and a coil 88 wound about core 86. Core 86 includes a substantially cylindrical wall 90 having an inner surface 92 and an outer surface 94. A plurality of teeth 96 extend radially inwardly from inner surface 92. Teeth 96 are arranged in a first row 98 and a second row 100. First row 98 is spaced apart from second row 100 to define an annular gap 102 therebetween. Coil 88 consists of a single wire having a first end 104 and a second end 106. As is known in the art, a magnetic field is generated when current is passed through coil 88. It should be appreciated that the intensity of the magnetic field varies as a function of the current passing through coil 88. Second half 84 is substantially a mirror image of first half 82 and therefore will not be described in greater detail.

Figure 5:
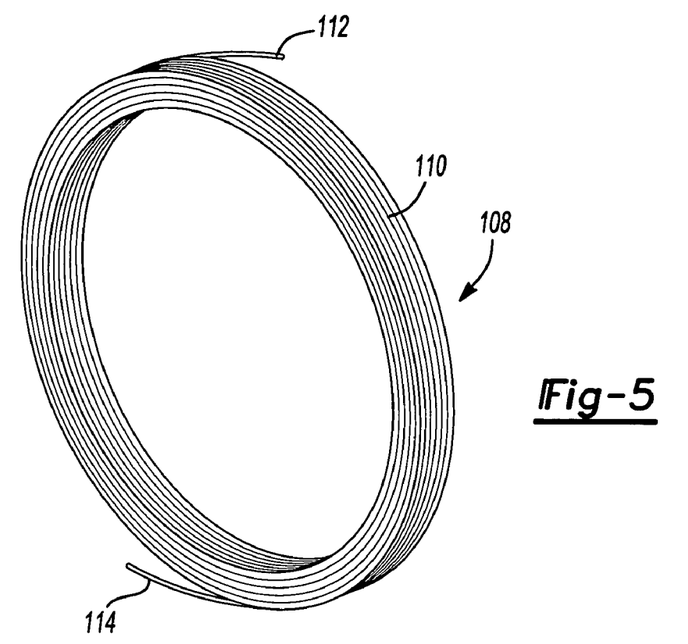
FIG. 5 is a perspective view of a second embodiment electromagnet for use in the differential of the present invention.
Figure 6:
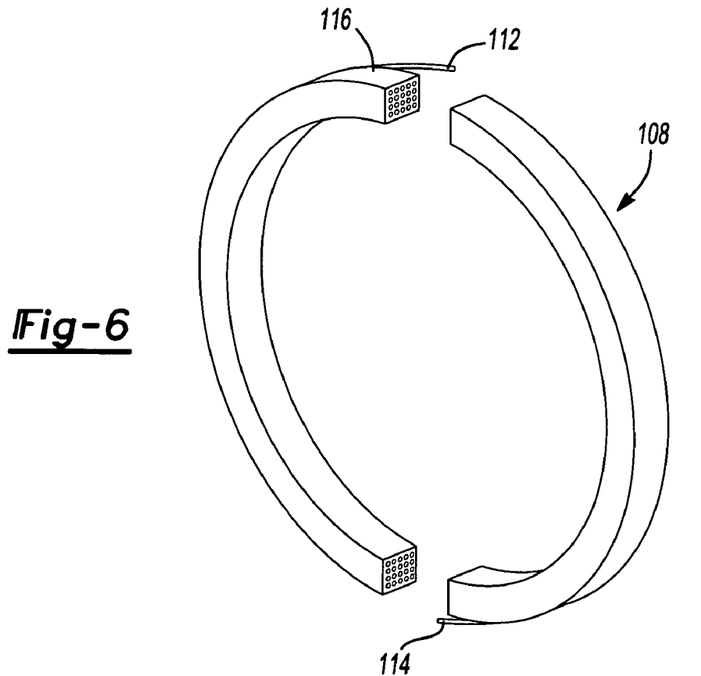
FIG. 6 is a fragmentary perspective view of the electromagnet of FIG. 5 including a cage of the present invention.

FIG. 5 depicts a second embodiment electromagnet 108 including a substantially cylindrically shaped coil 110 having a first end 112 and a second end 114. As shown in FIG. 6, electromagnet 108 may include an optional cage 116 to assist in positioning cylindrical coil 110 within differential case 40. Moreover, it should be appreciated that electromagnet 108 need only include a single closed loop of wire to produce a magnetic field. Accordingly, coil 110 may be formed in any number of shaped or sizes without departing from the scope of the present invention.

Figure 7:
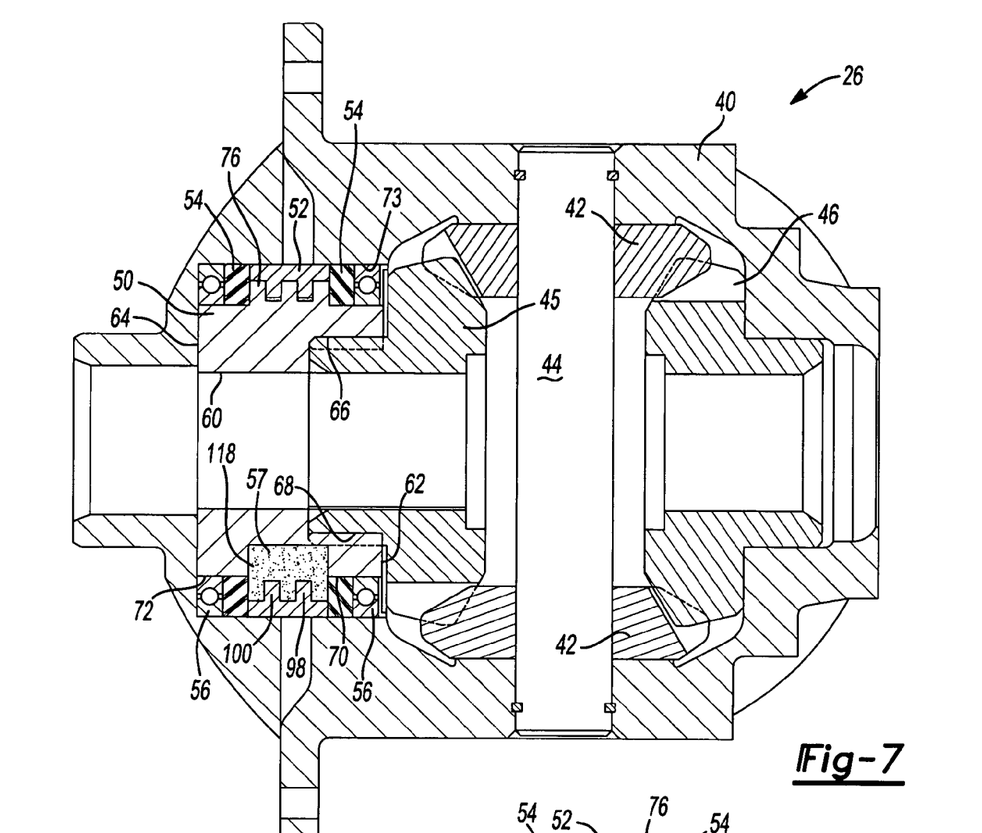
FIG. 7 is a sectional view taken through the differential of the present invention.

Concerning FIG. 7, bearings 56 are in contact with first and second outer cylindrical surfaces 70 and 72 to rotatably support rotor 50 and first side gear 45 within a bore 73 of differential case 40. Seals 54 are positioned adjacent bearings 56 to define a chamber 118. Electromagnet 52 is positioned within chamber 118 such that its first row of teeth 98 and its second row of teeth 100 are respectively positioned within annular grooves 77 and 79 formed in blades 76 of rotor 50. Magneto-rheological fluid 57 fills the remainder of chamber 118 including the spaces between teeth 96 and blades 76, as well as pockets 78 of rotor 50.

Magneto-rheological fluid 57 is a controllable fluid in which the viscosity of the fluid may be changed from a freely flowing liquid to a semi-solid when the fluid is exposed to a magnetic field. One known fluid is manufactured by Lord Corporation and sold under the tradename Rheonetic. When the magnetic field is removed, the magneto-rheological fluid returns to its original free-flowing liquid state. Advantageously, the response time for magneto-rheological fluid 57 to change between a steady-state semi-solid phase to a steady-state fluid phase is approximately one millisecond. Accordingly, an active limited slip differential having quick torque response characteristics may be provided.

During operation, rotation of first side gear 45 causes blades 76 of rotor 50 to pass through magneto-rheological fluid 57 positioned within chamber 118. When no current is flowing through coil 88, no magnetic field is generated by electromagnet 52. At this time, the force required for blades 76 to shear magneto-rheological fluid 57 during rotation is relatively low. Accordingly, differential assembly 26 acts as an "open" differential with little to no limited-slip function. If a torque distribution or limited-slip function is desirable between rear wheels 32 and 34, an electrical current is applied to coil 88 to cause electromagnet 52 to generate a magnetic field. Application of the magnetic field causes magnetically polarized particles within magneto-rheological fluid 57 to align themselves within the magnetic field. Various levels of viscosity may be obtained by varying the intensity of the magnetic field applied to magneto-rheological fluid 57.

As the viscosity of the magneto-rheological fluid is increased, the resistance to blades 76 passing through chamber 118 increases, effectively forming a coupling between differential case 40 and first side gear 45. By selectively increasing the resistance to rotation of blades 76, an active limited-slip differential is formed. If either wheel 32 or 34 were to encounter a low coefficient of friction surface, torque would be distributed from the slipping wheel to the driving wheel by simply supplying current to coil 88. The magnitude of the torque provided to the driving wheel is equal to the torque required to rotate blades 76 through magneto-rheological fluid 57.

Figure 8:
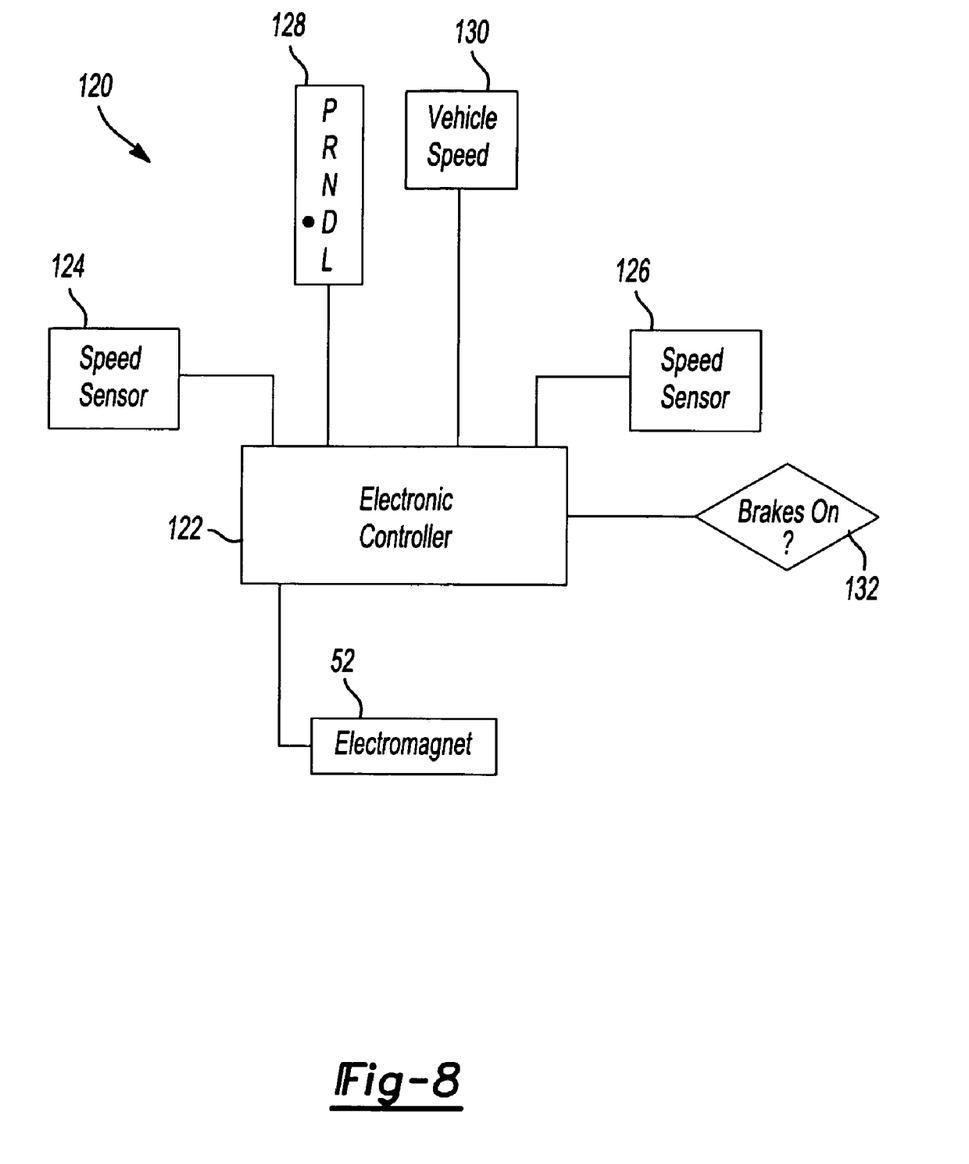
FIG. 8 is a schematic diagram of an electronic control system for use with the differential illustrated in FIGS. 1 and 2.

Referring now to FIG. 8, an exemplary electronic control system is generally indicated at reference numeral 120. Electronic control system 120 controls the operation of electromagnet 52 and, therefore the operation of differential assembly 26. Electronic control system 120 includes an electronic controller 122, electromagnet 52, a first speed sensor 124, and a second speed sensor 126. First speed sensor 124 collects data corresponding to the rotational speed of axleshaft 28. First speed sensor 124 is in communication with controller 122. Similarly, second speed sensor 126 measures the rotational speed of axleshaft 30 and outputs a signal to electronic controller 122 indicative thereof. Electronic controller 122 is configured in communication with electromagnet 52 such that electronic controller 122 may selectively direct current through coil 88 to produce a magnetic field. Depending on the data collected at any number of vehicle sensors such as a gear position sensor 128, a vehicle speed sensor 130, a transfer case range position sensor, or a brake sensor 132, the magnitude of current passed through coil 88 will be defined by electronic controller 122. Electronic controller 122 collects information regarding vehicle parameters such as vehicle speed, or may calculate parameters such as the magnitude of the differential speed between axleshafts 28 and 30. Electronic controller 122 compares the measured or calculated parameters to a predetermined value and outputs an electrical signal to create the desired strength magnetic field in electromagnet 52. Conditions ranging from a near "open" differential to a "locked" differential may be obtained. For example, when operating in conjunction with a four-wheel anti-lock braking system, electronic controller 122 will maintain differential assembly 26 in an "open" condition by not sending current to electromagnet 52 if a brake is being applied. Limiting axle differentiation at this time would counteract the anti-lock braking system. Other such situations may be programmed within electronic controller 122.

Figure 9:
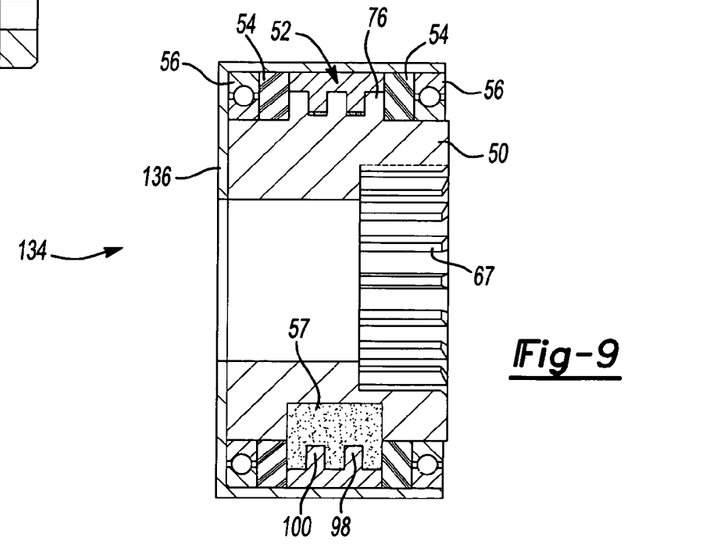
FIG. 9 is a sectional view of a modular pack magneto-rheological coupling of the present invention.

An alternate embodiment differential assembly may be constructed using a pre-assembled modular pack 134. Modular pack 134 includes a cup 136 preferably constructed from relatively thin stamped steel. Cup 136 houses seals 54, bearings 56, rotor 50, magneto-rheological fluid 57 and electromagnet 52 within a sealed module. Modular pack 134 may be assembled separately and prior to manufacture of differential assembly 26. Modular pack 134 may optionally include first side gear 45. During manufacture of differential assembly 26, modular pack 134 may be installed without requiring any special handling procedures for the magneto-rheological fluid.

While a rear drive axle assembly has been described in detail, it should be appreciated that the differential assembly of the present invention is not limited to such an application. Specifically, the differential assembly of the present invention may be used in transaxles for front-wheel drive vehicles, transfer cases for use in four-drive vehicles and/or a number of other vehicular driveline applications.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly for use in a motor vehicle having an engine and a pair of wheels, comprising;
   a pinion shaft adapted to receive drive torque from the engine;
   first and second axleshafts each adapted for connection to one of the pair of wheels;
   a differential assembly having a case driven by said pinion shaft, a gearset for transferring drive torque from said case to said first and second axleshafts, and a coupling for selectively coupling said gearset to said case, said case defining an interior cavity in communication with a bore such that said gearset is disposed within said interior cavity and said coupling is disposed within said bore, said coupling including an electromagnet fixed to said case and having a row of circumferentially aligned teeth, a rotor commonly driven with said first axleshaft and having blades defining an annular groove within which said row of teeth of said electromagnet are disposed, and a magnetically responsive fluid disposed in a chamber defined between said electromagnet and said rotor and having a viscosity which varies in response to exposure to a magnetic field; and
   a control system for actuating said electromagnet to generate said magnetic field and vary the viscosity of said fluid so as to selectively control rotation of said rotor relative to said electromagnet.

2. The axle assembly of claim 1 wherein said gearset includes a first side gear fixed for rotation with said first axleshaft, a second side gear fixed for rotation with said second axleshaft, and pinion gears driven by said case and meshed with said first and second side gears, and wherein said rotor is fixed for rotation with said first side gear.

3. The axle assembly of claim I wherein said coupling further includes a pair of seals disposed on opposite sides of said rotor blades so as to seal said chamber within which said magnetically responsive fluid is retained.

4. The axle assembly of claim 3 wherein said coupling further includes a pair of bearings disposed outboard of said seals for supporting said rotor for rotation relative to said case within said bore.

5. The axle assembly of claim 1 wherein said electromagnet includes two rows of circumferentially aligned teeth, wherein said blades of said rotor define a pair of annular grooves such that each row of teeth is aligned within a corresponding one of said annular grooves, and wherein said coupling further includes seals located on opposite sides of said rotor blades for sealing said chamber relative to said case.

6. The axle assembly of claim 1 wherein said control system is operable for sending an electric control signal to a coil associated with said electromagnet and includes a first sensor for detecting the rotary speed of said first axleshaft, a second sensor for detecting the rotary speed of said second axleshaft, a third sensor for determining an on/off status of a brake system associated with the motor vehicle, and a controller for receiving input signals from said sensors and generating said electric control signal in response thereto.

7. An axle assembly for use in a motor vehicle having an engine and a pair of wheels, comprising:
   a pinion shaft adapted to receive drive torque from the engine;
   first and second axleshafts each adapted for connection to one of the pair of wheels; and
   a differential assembly having a case driven by said pinion shaft, a gearset for transferring drive torque from said case to said first and second axleshafts, and a coupling for selectively coupling said gearset to said case, said case defining an interior cavity in communication with a bore such that said gearset is disposed within said interior cavity and said coupling is disposed within said bore, said gearset including first and second output gears coupled to corresponding first and second axleshafts and input gears operable to transfer drive torque from said case to said first and second output gears, said coupling including a selectively actuatable electromagnet fixed to said case and having a row of circumferentially aligned teeth, a rotor fixed for rotation with said first output gear and having blades defining an annular groove within which said row of teeth of said electromagnet are disposed, and a magnetically responsive fluid disposed in a chamber defined between said electromagnet and said rotor and having a viscosity which varies in response to a magnetic field.

8. The axle assembly of claim 7 further comprising a control system for actuating said electromagnet to generate said magnetic field and vary the viscosity of said fluid for selectively controlling rotation of said rotor relative to said electromagnetic.

9. The axle assembly of claim 7 wherein said first and second output gears include a first side gear fixed for rotation with said first axleshaft and a second side gear fixed for rotation with said second axleshaft, wherein said input gears include pinion gears driven by said case that are meshed with said first and second side gears, and wherein said rotor is fixed for rotation with said first side gear.

10. The axle assembly of claim 7 wherein said coupling further includes a pair of seals disposed on opposite sides of said rotor blades so as to seal said chamber within which said magnetically responsive fluid is retained.

11. The axle assembly of claim 10 wherein said coupling further includes a pair of bearings disposed outboard of said seals for supporting said rotor for rotation relative to said.

12. The axle assembly of claim 7 wherein said electromagnet includes two rows of circumferentially aligned teeth, wherein said blades of said rotor define a pair of annular grooves such that each row of teeth is aligned within a corresponding one of said annular grooves, and wherein said coupling further includes seals located on opposite sides of said rotor blades for sealing said chamber relative to said case.

13. The axle assembly of claim 7 further comprising a control system operable for sending an electric control signal to a coil associated with said electromagnet, said control system includes speed sensors for detecting a rotary speed difference between said first and second axleshafts, a brake sensor for determining an on/off status of a brake system associated with the motor vehicle, and a controller for receiving input signals from said sensors and generating said control signal in response thereto.

14. An axle assembly for use in a motor vehicle having an engine and a pair of wheels, comprising:
a pinion shaft adapted to receive drive torque from the engine;
first and second axleshafts each adapted for connection to one of the pair of wheels;
a differential assembly having a case driven by said pinion shaft, a gearset for transferring drive torque from said case to said first and second axleshafts, and a coupling for selectively coupling said gearset to said case, said case defining an interior cavity within which said gearset is disposed and a bore communicating with said interior cavity, said gearset including a first side gear fixed to said first axleshaft, a second side gear fixed to said second axleshaft, and pinion gears driven by said case and meshed with said first and second side gears, said coupling including a rotor that is rotatably supported in said bore and coupled to said first side gear and which has a plurality of blades extending outwardly therefrom, a selectively actuatable electromagnet coupled to said case and positioned between axial ends of said rotor, and a magnetically responsive fluid having a viscosity which varies in response to the presence of a magnetic field, said fluid is in communication with said blades and provides a selectable resistance to rotation of said blades relative to said electromagnet.

15. The axle assembly of claim 14 wherein said electromagnet is positioned within said bore adjacent said rotor.

16. The axle assembly of claim 14 wherein said rotor includes a plurality of offset rows of blades and wherein said electromagnet includes at least one row of teeth positioned between two of said rows of blades.

17. The axle assembly of claim 14 further including seals defining a chamber for containing said magnetically responsive fluid within said case.

18. The axle assembly of claim 17 further including bearings positioned outside of said chamber and rotatably supporting said rotor within said case.

19. The axle assembly of claim 14 further comprising a control system for sending an electric control signal to said electromagnet so as to generate and control the magnitude of said magnetic field applied to said fluid.

20. The axle assembly of claim 19 wherein said control system is operable for establishing a first mode wherein a minimum control signal is sent to said electromagnet so as to permit unrestricted rotation of said first side gear relative to said case, a second mode wherein a maximum control signal is sent to said electromagnet so as to prevent rotation of said first side gear relative to said case, and a third mode wherein said control signal is varied between its minimum and maximum values to adaptively control relative rotation between said first side gear and said case.

21. An axle assembly for use in a motor vehicle having an engine and a pair of wheels, comprising:
an input shaft adapted to receive drive torque from the engine;
first and second axleshafts each adapted for connection to one of the pair of wheels;
a differential assembly having a case driven by said input shaft and a gearset for transferring drive torque from said case to said first and second axleshafts, said gearset including a first side gear fixed to said first axleshaft, a second side gear fixed to said second axleshaft, and pinion gears driven by said case that are meshed with said first and second side gears, and
a coupling adapted to be installed in a bore in said case as a unit and including a housing coupled to said case within said bore, a rotor rotatably supported in said housing and coupled to said first side gear, said rotor having a plurality of blades extending outwardly therefrom, a selectively actuatable electromagnet positioned within said housing, and a magnetically responsive fluid having a viscosity which varies in response to the presence of a magnetic field, said fluid in communication with said blades of said rotor to provide selectable resistance to rotation of said rotor.

22. The axle assembly of claim 21 wherein said housing is shaped as a thin walled cup having a substantially cylindrical wall with an outer surface engaging a wall of said bore in said case.

23. The axle assembly of claim 21 wherein said coupling includes bearings positioned within said housing for rotatably supporting said rotor, and seals engaging an inner surface of said housing and an outer surface of said rotor to retain said magnetically responsive fluid within said housing.

24. The axle assembly of claim 21 further including an electronic controller in communication with said coupling to selectively operate said coupling in response to a vehicle signal.

25. The axle assembly of claim 24 wherein said vehicle signal is one of the group consisting of a wheel speed, a differential in wheel speed, a transfer case range position, a gear position, a vehicle speed, a brake application or a change in wheel speed.

* * * * *